United States Patent Office 3,431,606
Patented Mar. 11, 1969

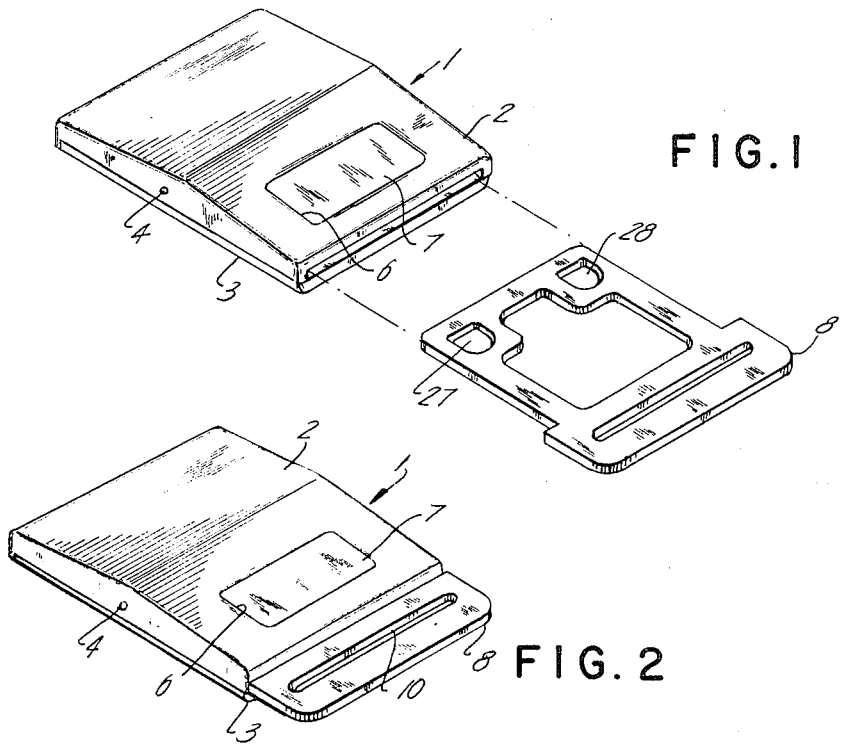
FIG. 1
FIG. 2
FIG. 3
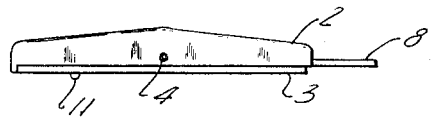
FIG. 4
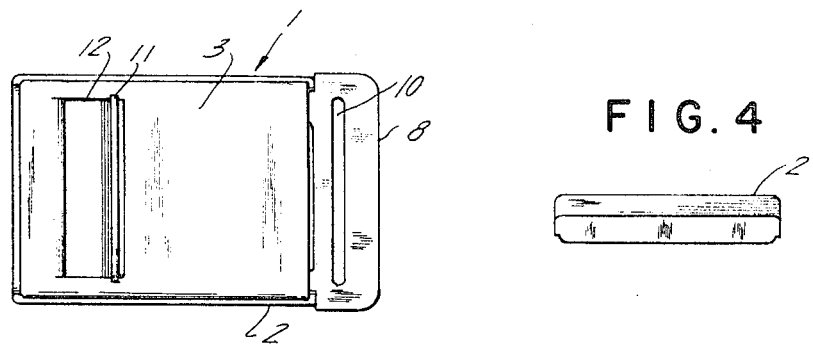
FIG. 5
INVENTOR.
GEORGE JANTZEN
BY M.C. Kestenbaum
ATTORNEY

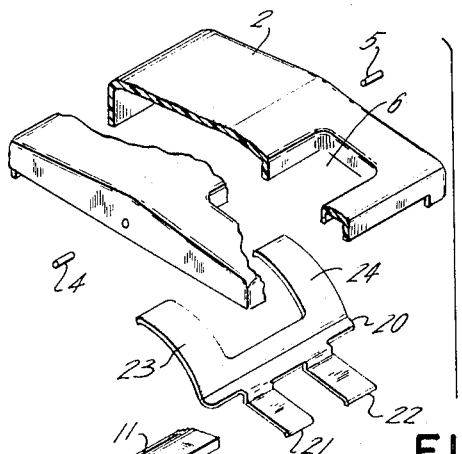
FIG.6
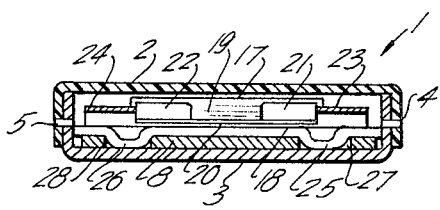
FIG.11
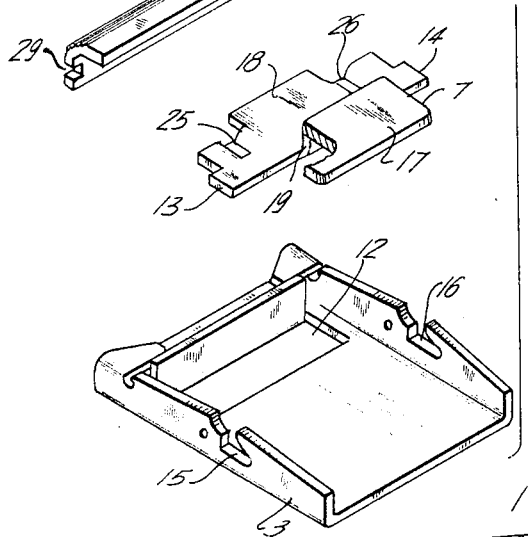
FIG.10
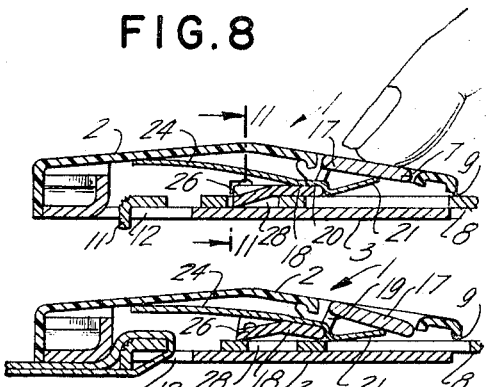
FIG.8
FIG.9
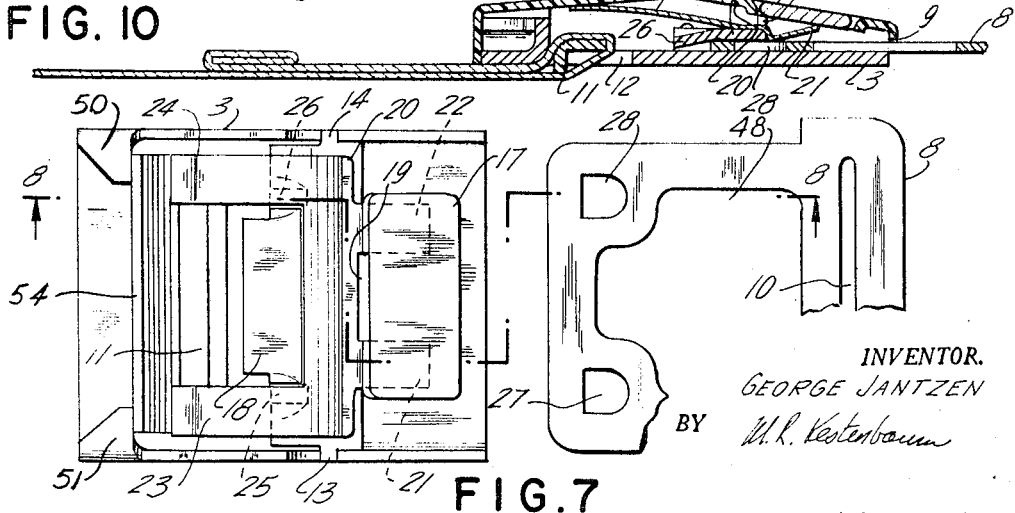
FIG.7
INVENTOR.
GEORGE JANTZEN
BY
ATTORNEY

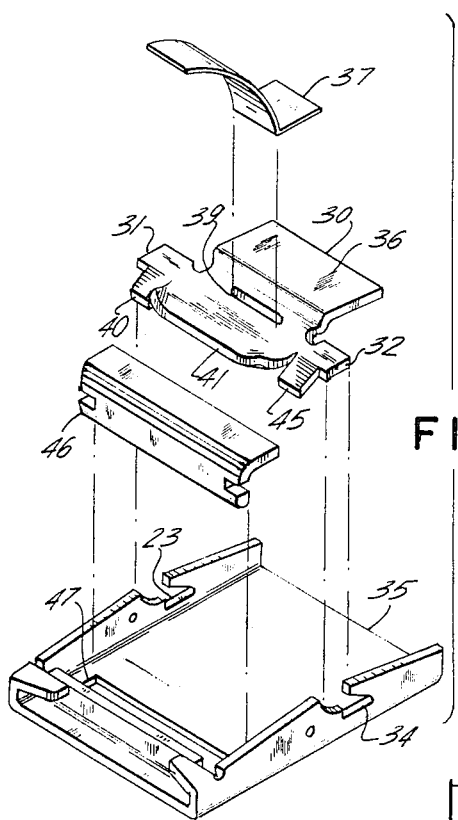
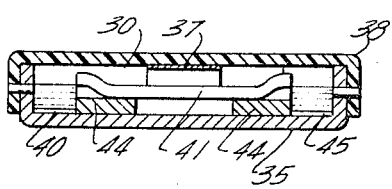
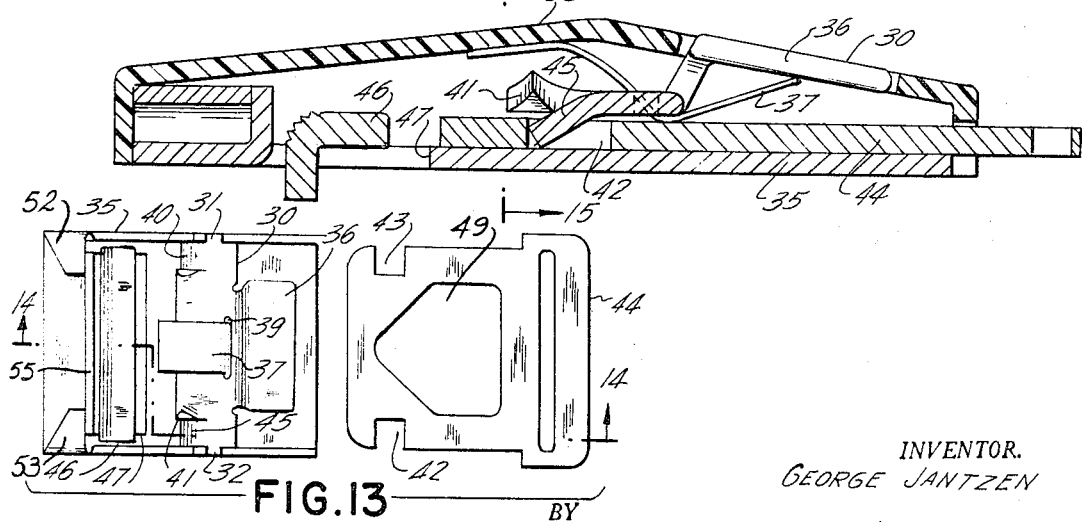

3,431,606
SAFETY BELT BUCKLE
George H. Jantzen, New York, N.Y., assignor to M. Steinthal & Company Incorporated, New York, N.Y., a corporation of New York
Filed Mar. 7, 1967, Ser. No. 621,313
U.S. Cl. 24—230
Int. Cl. A44b 11/25
10 Claims

ABSTRACT OF THE DISCLOSURE

A safety belt buckle of the push button type in which a single locking component is pivotably connected to the load bearing walls of the buckle base plate. The push button is at one end of the locking component and detents are at the other end and on the opposite side of the pivot axis. Spring urges the pushbutton away from the base plate and the detents towards the base plate.

---

This invention relates to safety belt buckles.

In the past several years, safety belts have come into their own for use in passenger automobiles. They, or provision for them, are required by various state laws and their use is urged as part of a continuing campaign to increase automobile safety. As safety belts approach the common place, every effort should be made to encourage their use and make it as convenient as possible. Little purpose is served when safety belts rest idly on store shelves or on automobile seats, unused.

To encourage their purchase and installation and to encourage their use thereafter, the buckles for safety belts should be attractive, easy to operate and light. And these qualities must be obtained without sacrificing the load bearing qualities of the buckle.

The present invention provides each of these qualities in a safety belt buckle of the pushbutton type. The working and locking components within the buckle are designed and arranged to enable the buckle to be exceedingly slim so that advantage can be taken in designing the external configuration of the buckle to accentuate its slimness and beauty. To complement a slim appearance, these working and locking components are designed and arranged so that the buckle is extremely light. At the same time, the buckle possesses high load bearing qualities, well exceeding the S.A.E. strength standards.

Accordingly, it is an object of this invention to provide a safety belt buckle of the pushbutton type which combines the qualities of high shock load strength, slimness and light weight.

Another object of this invention is to provide a safety belt buckle in which the loading on the buckle is transmitted from internal locking components to the metal base plate without loading the buckle cover so that the buckle cover can be of light and attractive plastic material.

Another object of this invention is to provide a safety belt buckle having high load bearing characteristics by providing near in-line loading on the members in the load bearing path.

A further object of this invention is to provide a safety belt buckle in which the buildup of working and locking components upon the base plate is held to a minimum.

These and other objects of this invention are accomplished in a safety belt buckle having a base plate which has a pair of spaced walls thereon. A locking component is pivotally connected to the walls. The locking component has a pair of detents at one end and a pushbutton portion at the other end. A spring member contacts the underside of the pushbutton portion so as to urge it away from the base plate and to urge the detents towards the base plate. A cover, advantageously of plastic or other light material is fitted over the base plate and its spaced walls. The spring member contacts the underside of the cover which gives it a footing from which to exert pressure upon the locking component. The cover has an opening over the pushbutton portion of the locking component which enables the pushbutton portion to be actuated.

The buckle according to the present invention will be more fully understood from the following detailed description taken in connection with the drawings in which:

FIGURES 1–5 show various views of a pushbutton buckle of slim external configuration made possible by the design and arrangement of the internal working and locking components in accordance with the present invention.

FIGURE 6 is an exploded view of one embodiment of a pushbutton buckle in accordance with this invention.

FIGURE 7 is a plan view of the buckle with the cover removed and showing the mating member with which the buckle locks.

FIGURES 8–10 are sectional views taken through section line 8—8 in FIGURE 7, and showing the working and locking components of the buckle in various operating positions.

FIGURE 11 is a sectional view taken through section line 11—11 in FIGURE 8.

FIGURE 12 is an exploded view of a second embodiment of a pushbutton buckle in accordance with this invention.

FIGURE 13 is a plan view of this second embodiment with the cover removed and showing the mating member with which the buckle locks.

FIGURE 14 is an enlarged sectional view taken through section line 14—14 in FIGURE 13.

FIGURE 15 is a sectional view taken through section line 15—15 in FIGURE 14.

Referring to FIGURES 1 through 5, a safety belt buckle is shown generally at 1. From the exterior, the buckle 1 is seen comprised of a cover 2 which is attached to a base plate 3 by side pins 4 and 5. The cover 2 may be formed from a choice of rigid materials, such as aluminum, steel or plastic. As will be described in further detail with reference to the design and arrangement of the working and locking components, the loading and operation of the buckle 1 imposes very little stress on the cover 2. As a result, the cover need be only strong and tough enough to retain the integrity of its shape under the wear and tear one would normally anticipate in use. I have found that a plastic cover is entirely satisfactory for this purpose and additionally has the advantage of contributing very little to the overall weight of the buckle. Therefore, the load bearing portions of the buckle, such as the base plate 3, can be thick and strong enough to withstand more than the largest anticipated shock loads while the buckle, overall, remains very light. Moreover, plastic as the cover material enables attractive textured surfaces or raised or embossed designs at little extra cost.

Off-centered towards one end of the top surface of the cover 2 is a rectangular opening 6 in which is fitted the pushbutton portion 17 of a locking component 7. The locking component 7 engages a mating locking member 8 which is inserted into the buckle 1 through a slot 9 at one end thereof. One of the two belt ends which are to be held together by the buckle 1 is threaded through a slot 10 in the locking member 8, folded back and sewn to itself. The other belt end is threaded around a snubber bar 11 which slides within a rectangular slot 12 in the base plate 3.

FIGURES 6, 7 and 8 show the arrangement of working and locking components in the buckle 1. The pushbutton locking member 7 has opposite tabs 13 and 14 thereon which enable the locking member 7 to pivot in the base plate 3 when the tabs 13 and 14 are inserted in slots 15 and 16 in the spaced walls of the base plate 3. The locking component 7 is composed of a pushbutton portion 17, a locking portion 18 and a narrower connecting portion 19. The pushbutton portion 17 is on the opposite side of the pivot axis of the tabs 13 and 14 from the locking portion 18. A spring member 20 has a pair of tabs 21 and 22 which straddle the connecting portion 19 to rest against the underside of pushbutton portion 17 and exert an upward pressure thereon. The spring member 20 rests upon the locking portion 18 and gains the upward spring pressure which it exerts on the pushbutton portion 17 (and the downward spring pressure which it exerts on a pair of detents 25 and 26) through tabs 23 and 24 which press against the underside of cover 2 when the cover 2 is in position over the base plate 3. As used herein, the directions upward and downward are taken as away from or towards the base plate 3 respectively.

The locking portion 18 of the locking component 7 has a pair of detents 25 and 26 thereon. These engage with individual ones of a pair of apertures 27 and 28 in the locking member 8 to lock the member 8 to the buckle 1 when the locking member 8 is inserted within the buckle 1.

The snubber bar 11 slides in the rectangular slot 12 in the base plate 3 along grooves 29 at each end of the snubber bar 11.

The operation of the working and locking components of the buckle 1 will be fully understood in connection with FIGURES 8 through 10. In FIGURE 8, the mating locking member 8 is locked within the buckle 1, with the detent 26 of the locking component 7 extending into the aperture 28 in the locking member 8. The upward pressure of the spring member 20 against the underside of the pushbutton portion 17 of the locking component 7 keeps the detent 26 pressed down against the base plate 3. In this position, the buckle 1 and the mating member 8 are engaged and locked.

When one presses against the bushbutton portion 17, actuating it inwardly of the buckle 1, the spring pressure is overcome and the detent 26 is raised out of the aperture 28. In this position, as shown in FIGURE 9, the locking member 8 is free to be withdrawn from the buckle 1. In FIGURE 10, the locking member 8 is seen being reinserted into locking engagement in the buckle 1. The underside of the detent 26 is sloped downward and away from the forward end of the locking member 8. As locking member 8 is pushed against it, the detent 26 will be raised up, overcoming the spring pressure and enabling the locking member 8 to pass into locking engagement.

It can be seen that in the buckle 1 only two components provide all of the working and locking features of the locking mechanism. These are the spring member 20 and the locking component 7. The thickness of the base plate 3 and the vertical buildup of these components determine the minimum thickness of the buckle. As used herein, the term "vertical buildup" means the buildup of components from off the base plate 3. This vertical buildup need be no greater than the thickness of the locking member 8, plus the thickness of the pushbutton portion 17, plus the distance towards the base plate 3 that the pushbutton portion 17 travels in moving the detents 25 and 26 a distance away from the base plate 3 slightly greater than the thickness of the locking member 8.

It has been found that in actual practice the vertical buildup according to this invention permits a buckle of overall slimness which is less than that obtained in buckles heretofore. As a result, the contour designs of the buckle exterior can take advantage of the slim silhouette in accentuating its beauty and eye appeal.

At the same time, the buckle 1 presents near in-line loading which enables it to withstand shock loads well in excess of the maximum contemplated for it in emergency use. This near in-line loading is transmitted from the locking member 8 to the detents 25 and 26, to the tabs 13 and 14, to the base plate 3 and to the snubber bar 11. The cover 2, is in no way in the load bearing path and can therefore be made of relatively low strength plastic material. Moreover, the ability of this buckle 1 to withstand shock loads depends principally upon the strength and thickness of the materials at the transmission places mentioned above. The buckle does not fail from the upsetting of the components or from slippage or separation between components. In tests, when the buckle was loaded to failure, failure occurred at the tabs 13 and 14, as the locking component 7 was pulled out of the base plate 3.

A second embodiment is shown in FIGURES 12 through 15. In this embodiment, a pushbutton locking component 30 is pivotable at its tabs 31 and 32 in slots 33 and 34 in a base plate 35. Upwards pressure is placed on the pushbutton portion 36 of the locking component 30 by a spring member 37 which passes through a slot 39 in the locking component 30 and rests at one end against the underside of the pushbutton portion 36 and at its other end against the underside of the cover 38. Locking engagement is established between the detents 45 and 40 on the locking portion 41 of the locking component 30 and cutouts 42 and 43 on the mating locking member 44. A snubber bar 46 slides in a rectangular slot 47 in the base plate 35. In operation, this embodiment functions in the same manner as the embodiment described above and exhibits similar advantages.

In both embodiments, the mating locking member 8 and 44 has a cutout 48 and 49 respectively therein. Besides reducing the weight of the buckle, the cutout 48 and 49 provides an additional operating feature. If the working and locking components of the buckle should be somewhat thrown out of line or the mating locking member should become somewhat bent or burred such as might occur if the buckle or the mating locking member should be jammed in the car door or the rails of the seat, the cutout 48 and 49 being aligned with the pushbutton portion 17 and 36 will provide clearance for additional travel of the pushbutton portion 17 and 36 respectively to release or engage the mating locking member.

In both embodiments, load bearing tabs 50, 51 and 52, 53 provide an additional strength feature. Stress on the snubber bar 11 and 46 is transmitted to the cooperating clamping member 54 and 55 respectively. In the case of very high shock loads, the load bearing tabs prevent the clamping member from peeling out of the base plate.

It should be understood that although the invention has been described with reference to two specific embodiments, neither of these embodiments is intended to be limiting in any way. Changes and modifications in these embodiments can be made without departing from the spirit and teachings of this invention.

I claim:

1. A safety belt buckle comprising a substantially flat base plate having a pair of spaced walls thereon, a locking component pivotably connected to said base plate walls about a pivot axis and having detent means and a pushbutton portion on opposite sides of said pivot axis from each other, spring means for urging said detent means towards said base pate and said pushbutton portion away from said base plate, said spring means pressing upwardly against said pushbutton portion at the underside thereof, retained by and pressing upwardly against said cover at the underside thereof and passing between said detent means and said pushbutton portion in the vicinity of said pivot axis, and a cover positioned upon said base plate having an opening therein exposing said pushbutton portion to enable actuation thereof, said buckle being adapted to receive a locking member beneath said pivot axis to displace and engage with said detent means.

2. A safety belt buckle in accordance with claim 1 in which said cover is of plastic material.

3. A safety belt buckle in accordance with claim 1 in which said spring means is comprised of first pair of flat spring arms which contact and press against said pushbutton portion at its underside and second pair of flat spring arms which contact and press against said cover at its underside.

4. A safety belt buckle in accordance with claim 1 in which a locking member is insertable in said buckle and is adapted for locking engagement with said detent means, the thickness of said buckle being approximately the thickness of said base plate plus the thickness of said locking member plus the thickness of said pushbutton portion plus the distance travelled by said pushbutton portion towards said base plate in moving said detent means a distance from said base plate slightly greater than the thickness of said locking member.

5. A safety belt buckle in accordance with claim 1 in which a locking member is insertable in said buckle and is adapted for locking engagement with said detent means, said locking member having a cutout therein alignable longitudinally and upwardly with said pushbutton portion to provide clearance for said pushbutton portion.

6. A safety belt buckle in accordance with claim 1 in which said locking component has a pair of laterally directed opposed tabs pivotally inserted in said base plate walls for pivotally connecting said locking component to said base plate walls.

7. A safety belt buckle in accordance with claim 6 in which said base plate walls have a pair of upwardly opening aligned slots for receiving said opposed tabs on said locking component.

8. A safety belt buckle according to claim 1 in which said spring means presses against said locking component over its pivot axis between said pushbutton portion and said detent means.

9. A safety belt buckle comprising a substantially flat base plate having a pair of spaced opposed walls thereon, each of said base plate walls having one of a pair of aligned slots therein, a locking lever having a pair of laterally directed opposed tabs pivotally inserted in said slots for pivotally connecting said locking lever to said walls and downwardy directed detent means and an upwardly directed pushbutton portion extending longitudinally on opposite sides of said tabs, a cover positioned upon said walls having an opening therein to enable actuation of said pushbutton portion, spring means extending longitudinally of said base plate pressing upwardly against the underside of said cover, contacting said locking lever in the vicinity of its pivot axis and pressing upwardly against the underside of said pushbutton portion for urging said detent means towards said baseplate, and a separable locking member insertable in said buckle, said buckle being adapted to receive said separable locking member beneath said lever tabs to displace and engage with said detent means.

10. A safety belt buckle in accordance with claim 9 in which said locking member has a cutout therein alignable longitudinally and upwardly with said pushbutton portion to provide clearance for said pushbutton portion.

References Cited
UNITED STATES PATENTS

| | | |
|---|---|---|
| 885,267 | 4/1908 | Martel. |
| 3,170,211 | 2/1965 | Van Noord. |
| 3,201,840 | 8/1965 | Jantzen. |
| 3,217,370 | 11/1965 | Sharpsteen. |
| 3,266,110 | 8/1966 | Davis. |
| 3,340,578 | 9/1967 | Straght. |
| 3,355,781 | 12/1967 | Silberschlag. |

BERNARD A. GELAK, *Primary Examiner.*